US010812836B2

(12) United States Patent
Mateik et al.

(10) Patent No.: US 10,812,836 B2
(45) Date of Patent: Oct. 20, 2020

(54) BROADBAND LIVE STREAMING HUB FOR A MEDIA PROCESSOR

(71) Applicant: The DIRECTV Group, Inc., El Segundo, CA (US)

(72) Inventors: Eileen Mateik, Torrance, CA (US); Steven Allstead, Jr., Long Beach, CA (US); Cory Max Bernhardt, Lomita, CA (US); Michael Habif, Lakewood, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 16/418,335

(22) Filed: May 21, 2019

(65) Prior Publication Data

US 2019/0273952 A1 Sep. 5, 2019

Related U.S. Application Data

(63) Continuation of application No. 15/454,798, filed on Mar. 9, 2017, now Pat. No. 10,349,090.

(51) Int. Cl.
*H04N 21/2187* (2011.01)
*H04N 21/482* (2011.01)
*H04N 21/422* (2011.01)
*H04N 21/472* (2011.01)
(Continued)

(52) U.S. Cl.
CPC ... *H04N 21/2187* (2013.01); *H04N 21/42204* (2013.01); *H04N 21/4316* (2013.01);
(Continued)

(58) Field of Classification Search
None
See application file for complete search history.

(56) References Cited

U.S. PATENT DOCUMENTS 7,472,197 B2   12/2008   Li et al.
8,554,840 B1   10/2013   Milgramm et al.
(Continued)

FOREIGN PATENT DOCUMENTS

CN   104661044 A       5/2015
WO   2016008974        1/2016
WO   2016192431 A1     12/2016

*Primary Examiner* — Justin E Shepard
(74) *Attorney, Agent, or Firm* — Guntin & Gust, PLC; Atanu Das

(57) ABSTRACT

Aspects of the subject disclosure may include, for example, a processing system and a memory storing instructions that, when executed by the processing system, facilitate performance of operations. The operations can include obtaining a plurality of live streams at a broadband connection to the processing system; providing an interface to facilitate input via a control device communicating with the processing system; presenting, responsive to a first user input, the live streams simultaneously at a display device; and identifying, responsive to a second user input, a set of favorite streams. The operations can also include presenting a program guide at the display device. The program guide can include a plurality of program guide objects; each of the set of favorite streams can include a separate program guide object that accordingly is selectable, via user input to the program guide, for presentation at the display device. Other embodiments are disclosed.

20 Claims, 11 Drawing Sheets

(51) Int. Cl.
  *H04N 21/84*   (2011.01)
  *H04N 21/438*  (2011.01)
  *H04N 21/431*  (2011.01)
  *H04N 21/61*   (2011.01)

(52) U.S. Cl.
  CPC ... *H04N 21/4383* (2013.01); *H04N 21/47202* (2013.01); *H04N 21/482* (2013.01); *H04N 21/4826* (2013.01); *H04N 21/4828* (2013.01); *H04N 21/6125* (2013.01); *H04N 21/84* (2013.01)

(56) References Cited

U.S. PATENT DOCUMENTS

| | | |
|---|---|---|
| 8,893,202 B2 | 11/2014 | Smith et al. |
| 9,021,541 B2 | 4/2015 | Pavlovskaia et al. |
| 2002/0080165 A1* | 6/2002 | Wakefield ............ G06Q 30/02 715/738 |
| 2002/0199185 A1 | 12/2002 | Kaminski et al. |
| 2005/0160465 A1 | 7/2005 | Walker et al. |
| 2008/0060005 A1* | 3/2008 | Shanks ............ H04N 5/44543 725/38 |
| 2010/0077441 A1* | 3/2010 | Thomas ............ G06F 3/1415 725/133 |
| 2011/0158149 A1 | 6/2011 | Mugulavalli et al. |
| 2011/0167385 A1* | 7/2011 | Charrue ............ H04N 5/44543 715/825 |
| 2012/0216228 A1 | 8/2012 | Padi et al. |
| 2012/0216232 A1 | 8/2012 | Chen et al. |
| 2012/0266202 A1 | 10/2012 | Rosa et al. |
| 2018/0262782 A1 | 9/2018 | Mateik et al. |

* cited by examiner

300

400

600

700

BROADBAND LIVE STREAMING HUB FOR A MEDIA PROCESSOR

CROSS-REFERENCE TO RELATED APPLICATION

This application is a continuation of U.S. application Ser. No. 15/454,798, filed Mar. 9, 2017, which is incorporated by reference herein in its entirety.

FIELD OF THE DISCLOSURE

The subject disclosure relates to receiving and viewing live streaming content using a media processor (e.g. a set top box or STB), and more particularly to a live streaming hub executing on the STB.

BACKGROUND

Online streaming sites are popular with users. At any given time, several live streams of video content may be available for viewing at a user's display device (typically connected to a STB for receiving content from a content provider system).

BRIEF DESCRIPTION OF THE DRAWINGS

Reference will now be made to the accompanying drawings, which are not necessarily drawn to scale, and wherein.

DETAILED DESCRIPTION

Figure 1:
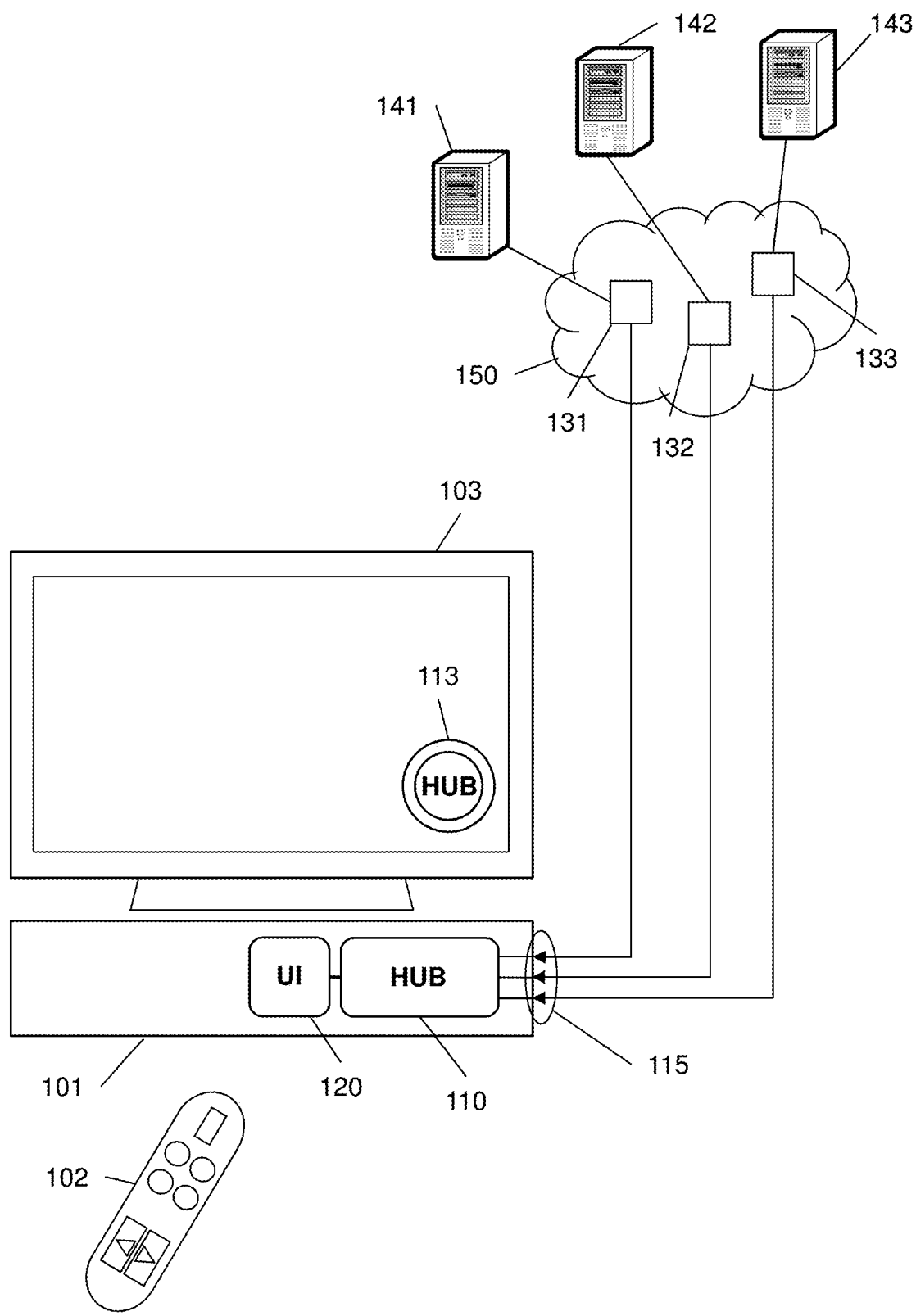
FIG. 1 depicts an illustrative embodiment of a system for receiving and viewing live streaming content, including a display device and a set top box (STB) with a broadband live streaming hub executing thereon.

The subject disclosure describes, among other things, illustrative embodiments for selecting, presenting and saving internet live streams on a media processor. Other embodiments are described in the subject disclosure.

One or more aspects of the subject disclosure include a method comprising obtaining, by a processing system including a processor, a plurality of live streams at a broadband connection to the processing system. The method also comprises providing an interface to facilitate user input via a control device in communication with the processing system; and presenting, responsive to a first user input, the plurality of live streams simultaneously at a display device. The method further comprises searching, responsive to a second user input, available live streams to identify one live stream in accordance with criteria in the second input including a content title, a content keyword, a universal resource locator (URL), or a combination thereof; and presenting the identified live stream at the display device. The method further comprises presenting, responsive to a third user input, a predetermined set of live streams simultaneously at the display device; the set of live streams is a set of featured streams determined by the processing system in accordance with predefined criteria, a set of favorite streams determined in accordance with user input, or a combination thereof. The method also comprises presenting a program guide at the display device; the program guide includes a plurality of program guide objects, and each of the set of live streams comprises a separate program guide object and accordingly is selectable, via user input to the program guide, for presentation at the display device.

One or more aspects of the subject disclosure include a device comprising a processing system including a processor, and a memory that stores executable instructions that, when executed by the processing system, facilitate performance of operations. The operations comprise obtaining a plurality of live streams at a broadband connection to the processing system; providing an interface to facilitate user input via a control device in communication with the processing system; presenting, responsive to a first user input, the plurality of live streams simultaneously at a display device; and identifying, responsive to a second user input, a set of favorite streams. The operations further comprise presenting a program guide at the display device; the program guide includes a plurality of program guide objects, and each of the set of favorite streams comprises a separate program guide object and accordingly is selectable, via user input to the program guide, for presentation at the display device.

One or more aspects of the subject disclosure include a machine-readable storage medium comprising executable instructions that, when executed by a processing system of a media processor, facilitate performance of operations. The operations comprise obtaining a plurality of live streams at a broadband connection of the media processor to the processing system, and providing an interface to facilitate user input via a remote control device for the media processor. The operations also comprise presenting, responsive to a first user input, the plurality of live streams simultaneously at a display device coupled to the media processor; and identifying, responsive to a second user input, a set of favorite streams. The operations further comprise presenting a program guide at the display device; the program guide includes a plurality of program guide objects, and each of the set of favorite streams comprises a separate program guide object and accordingly is selectable, via user input to the program guide, for presentation at the display device.

FIG. 1 schematically illustrates a system 100 enabling a user to find, watch, and save live streaming content. A media processor (e.g a set top box or STB) 101 receives and processes online content, which can be viewed at display device 103. In this embodiment, the media processor is controlled using a remote control device 102. Media processor 101 makes a broadband connection 115 to network 150 (e.g. the internet). The network includes numerous sites 131, 132, 133 delivering live streaming content provided by content servers 141, 142, 143 (for example, Twitch, Veetle, Ustream, etc.).

A live streaming hub 110, executing on the media processor 101, can cause one or more live streams to be displayed on display device 103. The hub 110 provides a user interface 120 to receive instructions for selecting a live stream for viewing, identifying favorite streams, and performing other functions as detailed below. In this embodiment, user input is performed via the remote control 102, to make selections and transmit instructions to the hub 110. As shown in FIG. 1, hub 110 can cause an icon 113 to be displayed on device 103 for activating the hub. The icon can be selected by using a pointer integrated into the remote control, a dedicated button on the remote control, etc. In an embodiment, the hub can be activated by a voice command.

Figure 2:
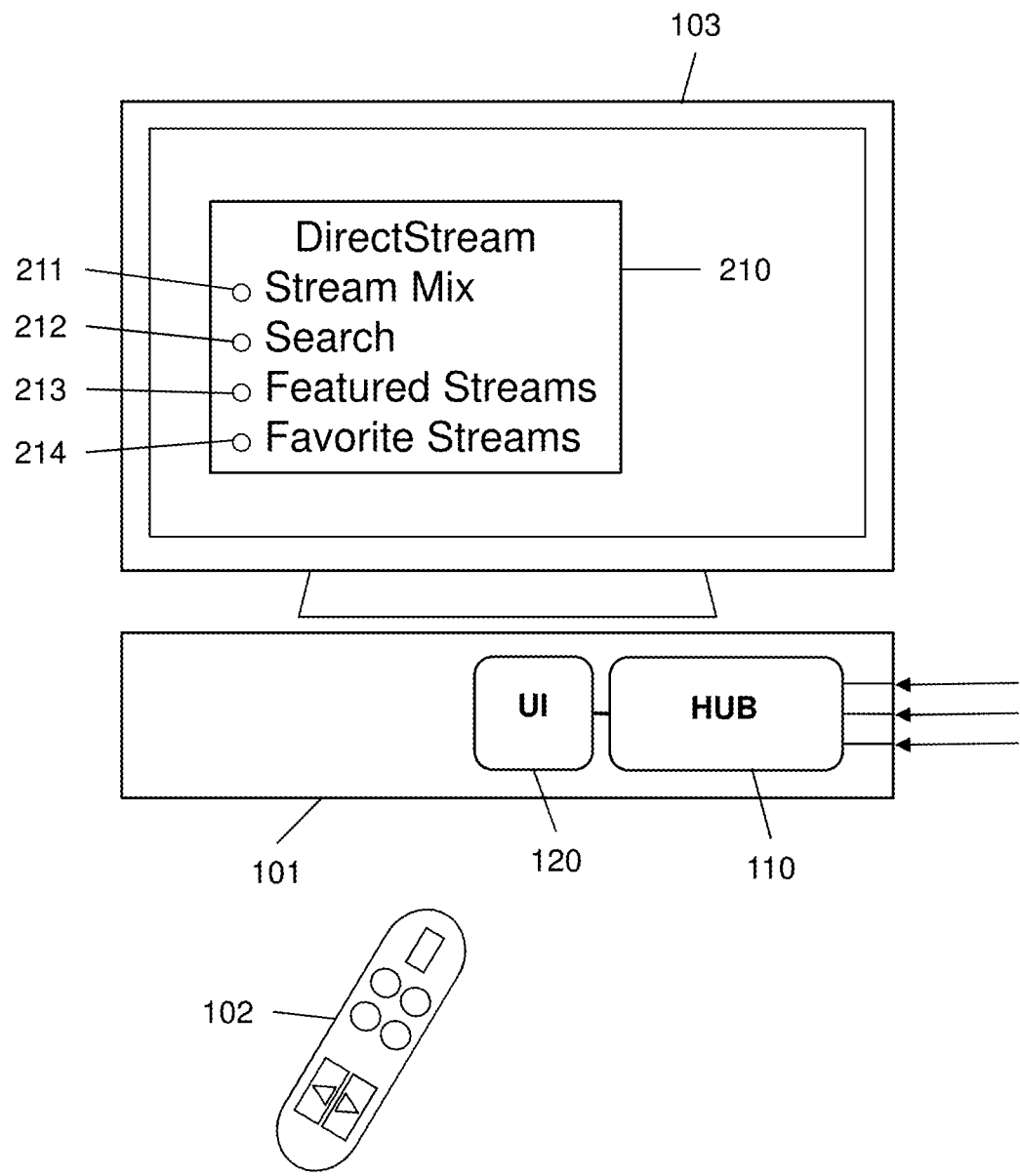
FIG. 2 schematically illustrates a menu for selecting and viewing live streams, in accordance with embodiments of the disclosure.

FIG. 2 illustrates an embodiment 200 in which the hub 110 is activated (e.g. by pointing the control device 102 at icon 113) resulting in display of a main page including a menu 210 for invoking various features of the hub. As shown in FIG. 2, the menu can include selectable items 211-214, labeled "Stream Mix," "Search," "Featured Streams," and "Favorite Streams." In this embodiment, selection of menu items and navigation of pages presented by the hub 110 are performed using remote control device 102. It will be appreciated that the remote control device 102 in this embodiment communicates only with media processor 101 including hub 110, and not with another computing device; accordingly, the hub functions described herein do not involve a browser.

Figure 3:
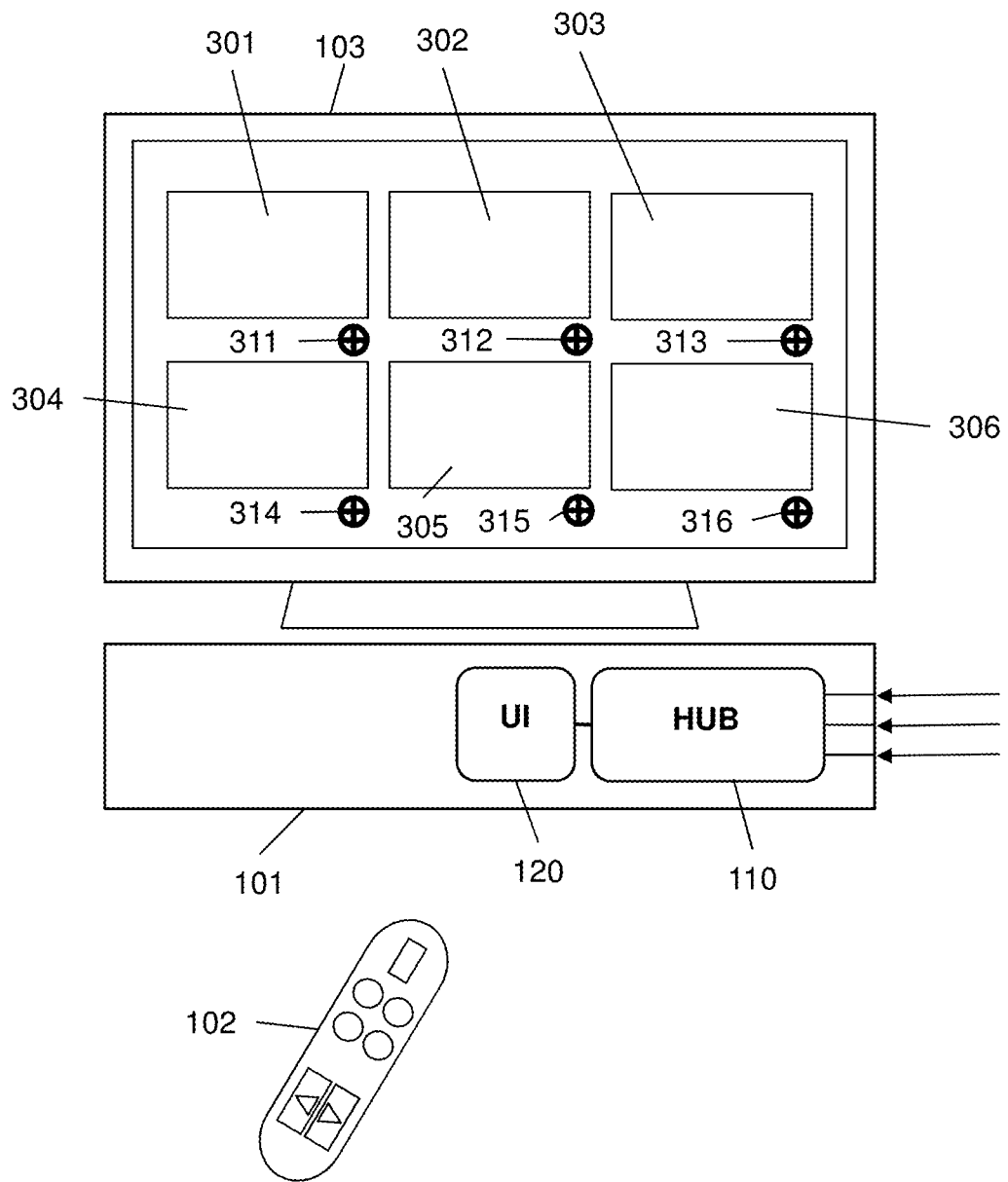
FIGS. 3 and 4 schematically illustrate simultaneous display of multiple live streams and display of a menu on a selected live stream, in accordance with embodiments of the disclosure.

FIG. 3 schematically illustrates a "Stream Mix" function, in accordance with an embodiment 300 of the disclosure. In this embodiment, the hub presents several live streams 301-306 simultaneously on display device 103, with corresponding selectable buttons 311-316. A user can select one or more of the buttons with the remote control device 102, to indicate a desired stream(s). In an embodiment, selecting one button causes the selected stream to be displayed in a full-screen mode (that is, the selected stream occupies the entire area of the display).

In an embodiment, streams 301-306 are obtained in real time from various network sites; the user can specify which site(s) are to be accessed to obtain live streaming content. Alternatively, one or more streams can be taken from a predefined set of streams ("Featured Streams" and/or "Favorite Streams," discussed below).

Figure 4:
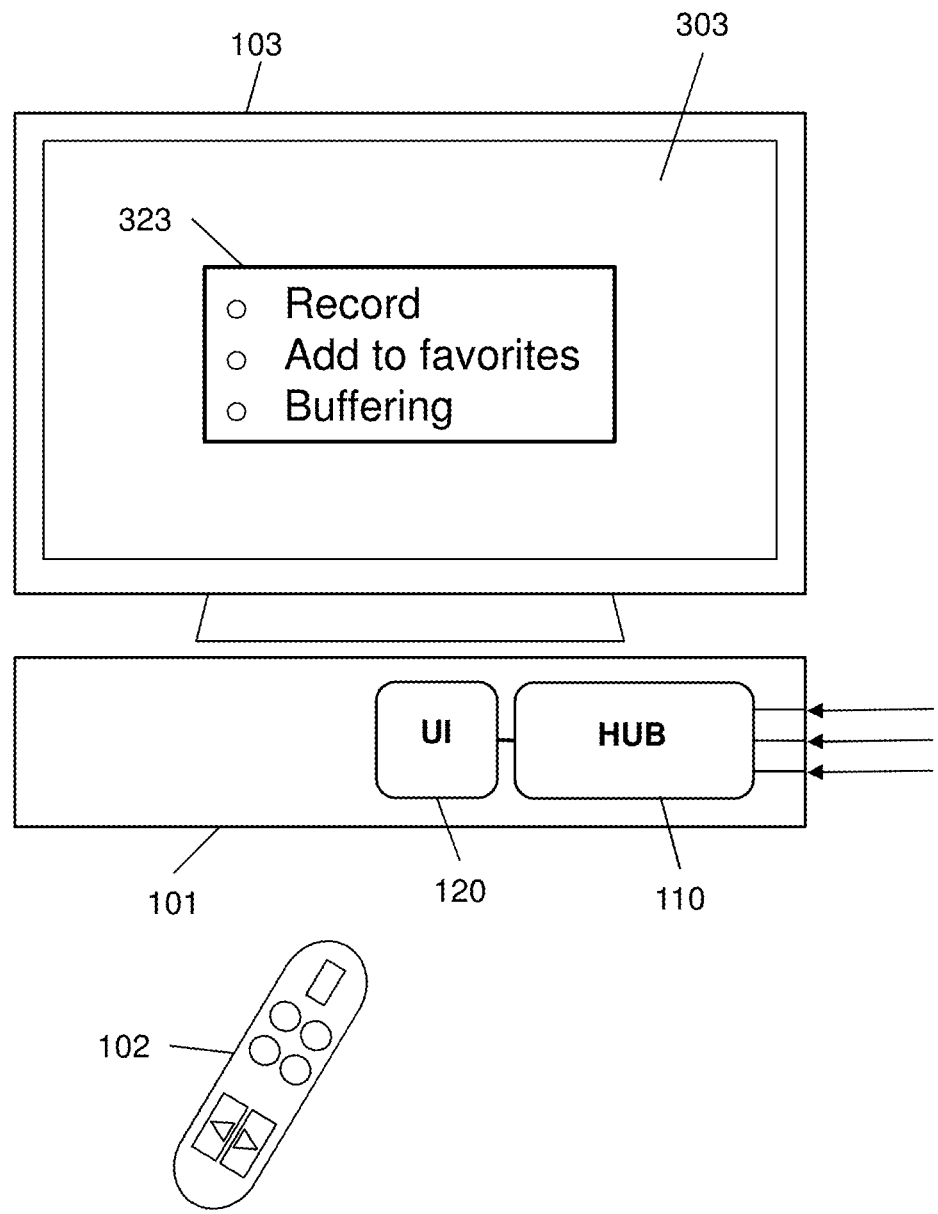

FIG. 4 schematically illustrates an embodiment 400 in which selecting a button on the "Stream Mix" display causes a menu to be superimposed on the live stream (for example, menu 323 superimposed on a full-screen display of stream 303, resulting from selection of button 313). Menu 323 can include selectable items, including for example recording the current stream; adding to a list of favorite streams associated with the user; buffering the live stream content, etc. In a further embodiment, the user can select buffering, and can then invoke trickplays (e.g. pause, rewind, fast-forward, etc.) on the buffered content.

Figure 5:
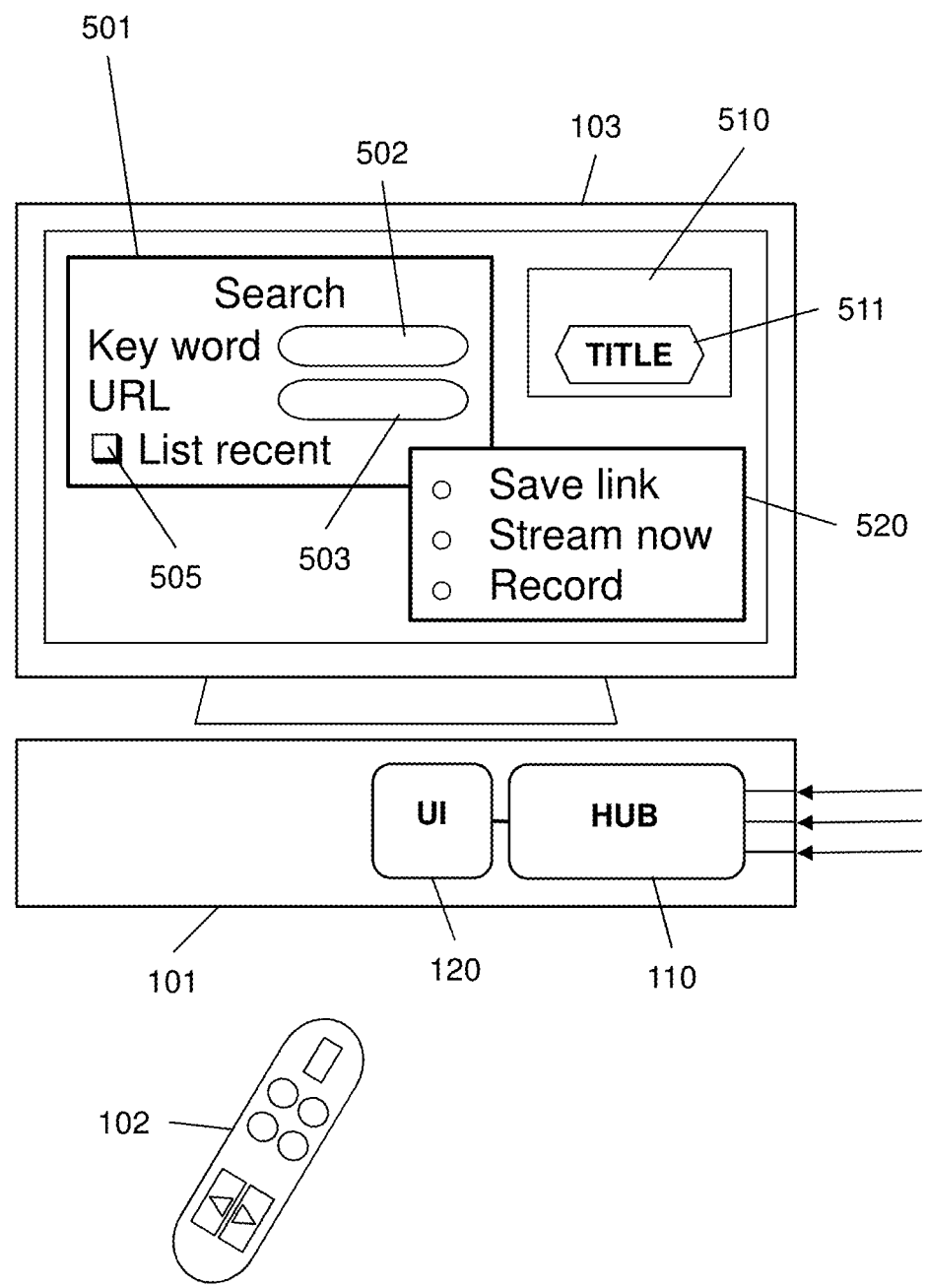
FIG. 5 schematically illustrates searching for live streaming content, in accordance with embodiments of the disclosure.

FIG. 5 schematically illustrates a "Search" function, in accordance with an embodiment 500 of the disclosure. In this embodiment, selection of the search function (e.g. by selecting button 212 on the main page) results in display of a search menu 501. The user can enter key word(s) in a portion 502 of the display; in an embodiment, a list of live streams associated with the key word(s) is generated and displayed. Alternatively, the user can enter a URL for a live stream in a portion 503 of the display. In another embodiment, the user can select a button 505 to cause a display of a list of recent streams.

The search results can be presented as a list of titles of live streams; a thumbnail of each live stream can be displayed with the title. In an embodiment, the live stream best matching the key word (or matching the URL) is shown on a portion 510 of the display, along with the title 511 of the live stream.

The user can then select the search result corresponding to the live stream he wishes to view. In this embodiment, selection of a result causes another menu 520 to be displayed, showing options for saving a link to the stream (thereby adding the stream to the user's favorites list), showing the live stream, and/or recording the live stream.

Figure 6:
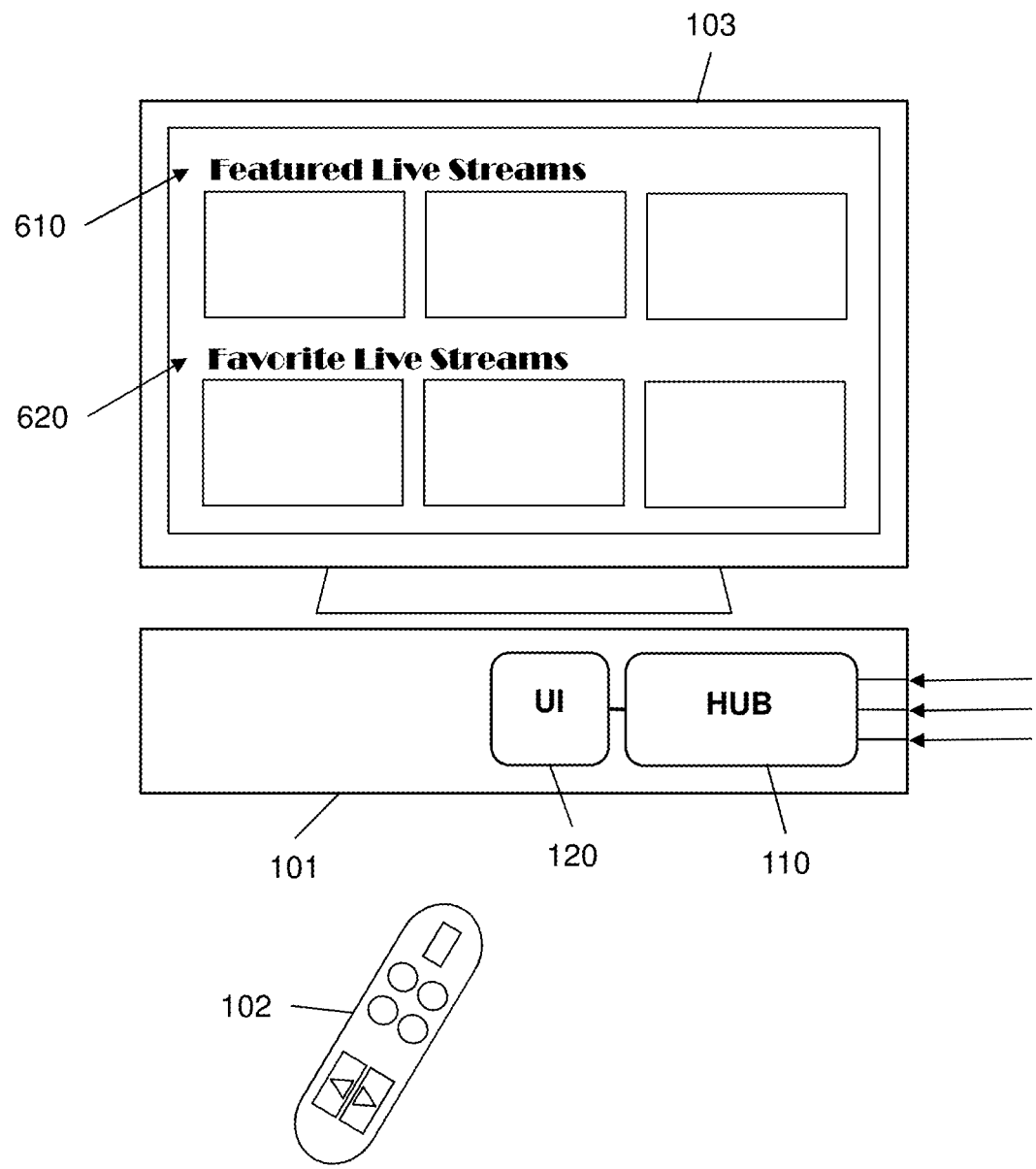
FIG. 6 schematically illustrates display of featured and favorite live streams, in accordance with embodiments of the disclosure.

FIG. 6 schematically illustrates "Featured Streams" and "Favorite Streams" functions, in accordance with an embodiment 600 of the disclosure. In this embodiment, the user can build and maintain a list of favorite streams by saving a link to a selected stream or removing a link. Selection of "Favorite Streams" (e.g. by selecting button 214 on the main page) can cause a simultaneous display (i.e. a stream mix) 620 of the user's favorite streams; the user can then select one of the streams for viewing in full-screen mode. Selection of "Featured Streams" (e.g. by selecting button 213 on the main page) can cause a simultaneous display 610 of streams selected by a content provider system to which the user is a subscriber. Featured streams and favorite streams 610, 620 can also be included in the "Stream Mix" display. The user can also add a featured stream to his favorite streams, e.g. by selecting a featured stream shown in display 610.

Figure 7:
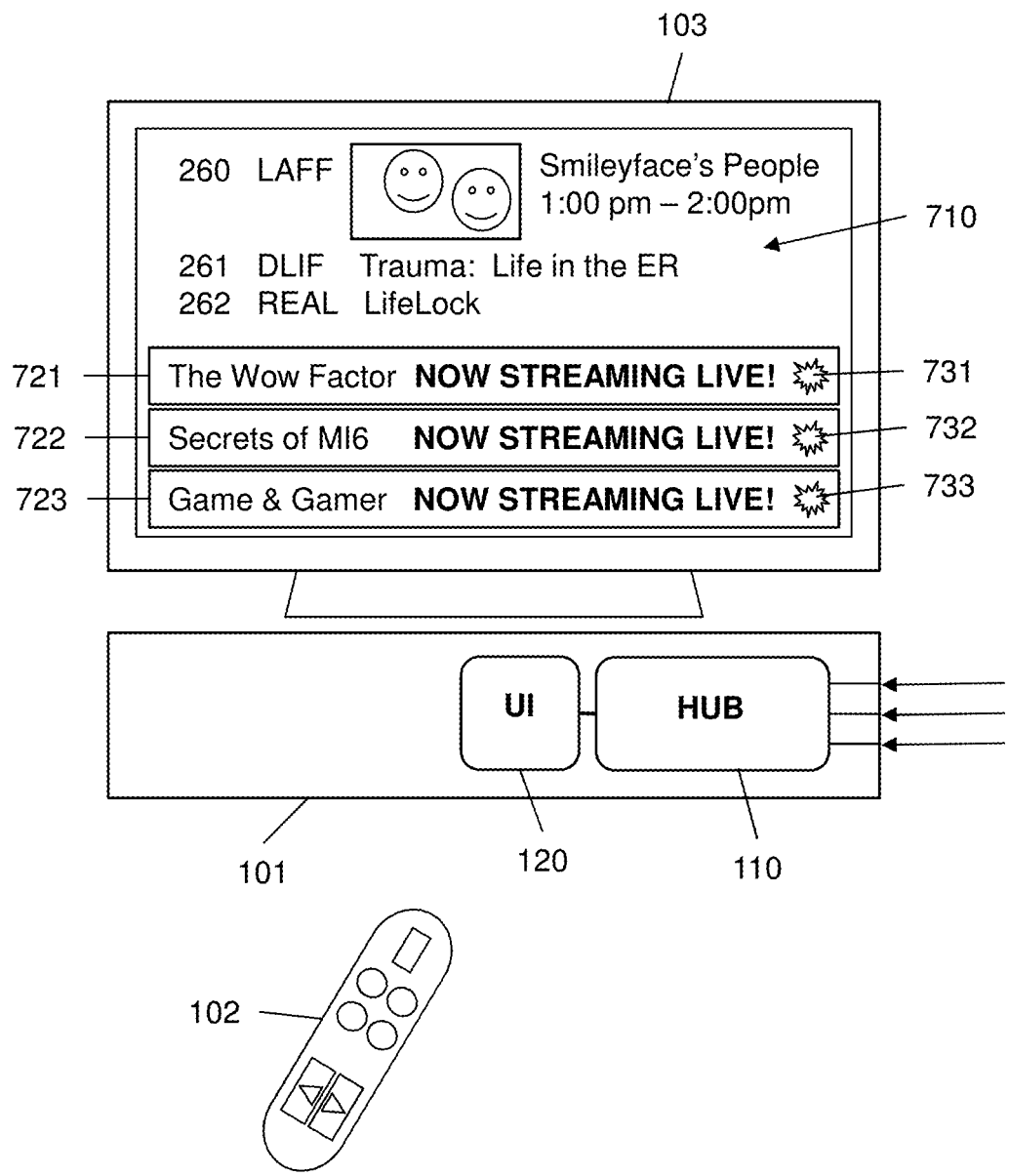
FIG. 7 schematically illustrates a program guide for video content, including featured and favorite live streams, in accordance with embodiments of the disclosure.

FIG. 7 schematically illustrates an embodiment 700 in which a user is presented with an editable program guide. In this embodiment, a portion 710 of the program guide displays information about the program presently being played (for example the channel number, the program title and time slot, and a thumbnail of the content being presented), and information regarding programs available on other channels. Featured live streams and/or favorite live streams are listed in another portion of the program guide as guide objects 721, 722, 723. In this embodiment, selecting one of these guide objects (e.g. by selecting icon 731, 732 or 733) causes the live stream to be displayed in full-screen mode. Each guide object can include the title of the stream, a graphic associated with the stream, an icon for selecting the stream, etc. The user can thus maintain a list of favorite streams in the program guide, with each of the favorite streams being displayed similarly to a standard program channel.

Figure 8:
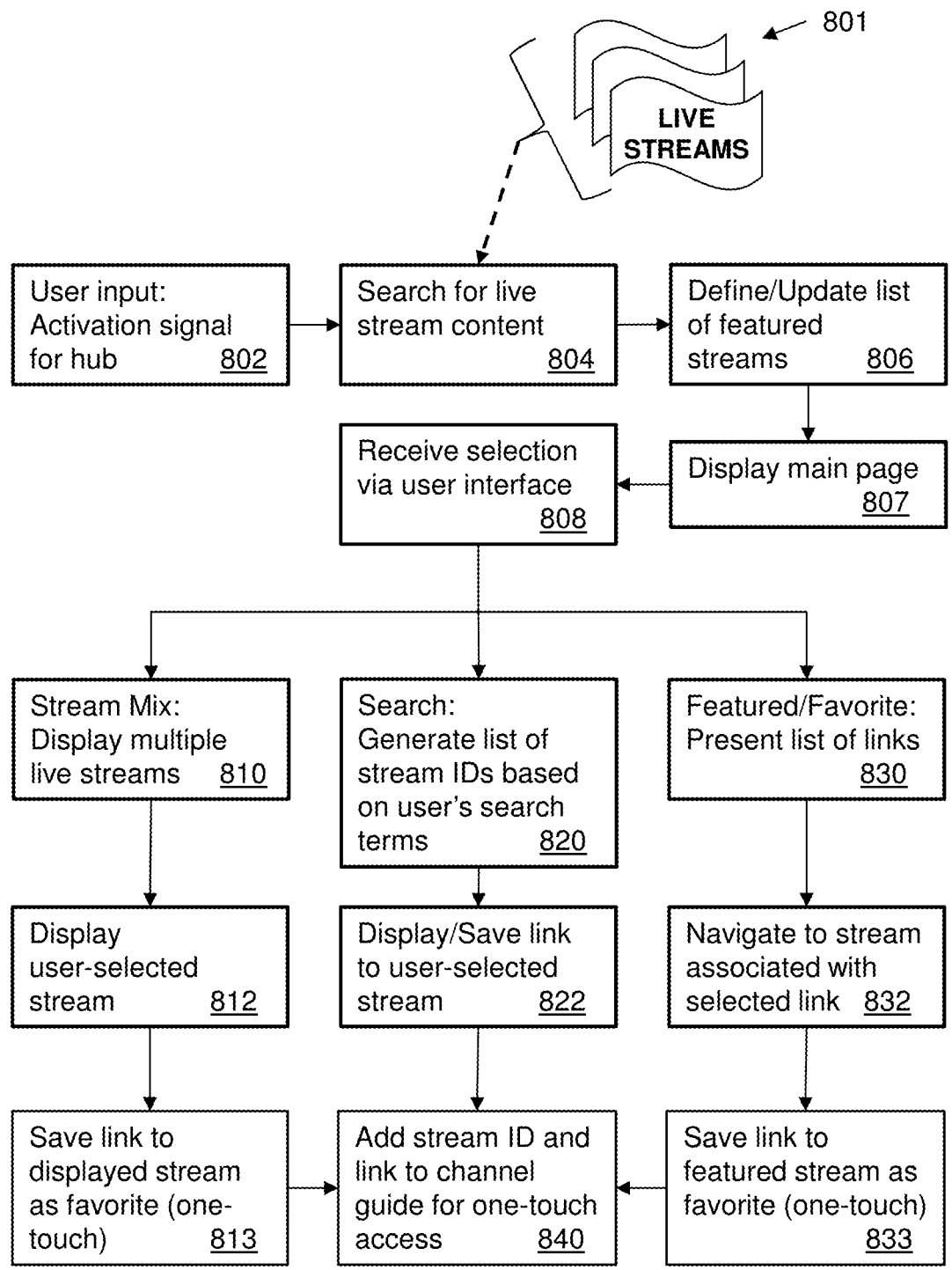
FIG. 8 is a flowchart depicting an illustrative embodiment of a method used in portions of the system described in FIGS. 1-6.

FIG. 8 is a flowchart illustrating a method 800 for selecting and displaying live streams, in accordance with embodiments of the disclosure. In step 802, the media processor receives an activation signal for the hub; the activation signal corresponds to a user input (e.g. selecting icon 113 on display 103 with remote control 102). The hub obtains live stream content 803 via the broadband connection of the media processor (step 804). The hub can then select streams to be included in a list of featured streams (step 806). The main page is displayed to the user (step 807); the user selects a function and communicates the selection to the hub (step 808).

If the user selects the "Stream Mix" function, the user is presented with a display of simultaneous current streams (step 810). In response to the user selecting a stream from the stream mix, the selected stream is displayed (step 812). The user can optionally add the selected stream to his list of favorite streams by saving a link to that stream (step 813). Once the link is added to the list of favorites, the user can display the stream by accessing the link (that is, no search is required).

If the user selects the "Search" function, the user is prompted to enter search terms (key word(s) or a URL); a list of stream identifiers is then generated as search results (step 820). In response to the user selecting a stream from the search results, the selected stream is displayed; the user can optionally add the selected stream to his list of favorite streams by saving a link to that stream (step 822).

If the user selects the "Featured Streams" or "Favorite Streams" function, the user is presented with a list of links to those streams, and/or a display that includes a mix 610-620 of the listed streams (step 830). The user can then navigate to a selected stream (step 832), and optionally save a link to a featured stream as a favorite stream (step 833).

In an embodiment, an identifier and a link for any selected stream can be added to a program guide (step 840), with each stream having a separate selectable listing in the guide (similar to a channel in the program guide).

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 9:
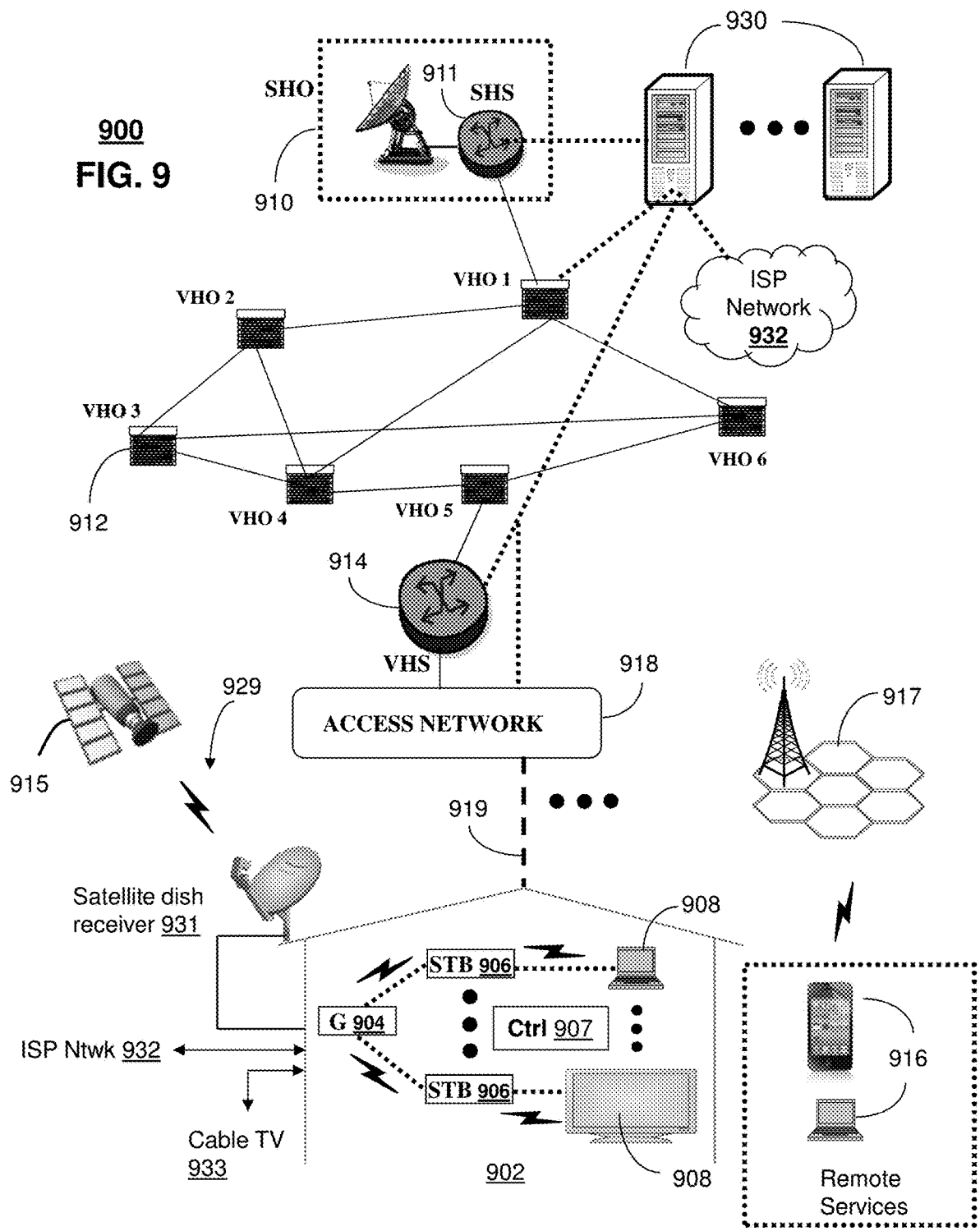
FIG. 9 depicts an illustrative embodiment of a communication system for providing media services to the system of FIGS. 1-6.

FIG. 9 depicts an illustrative embodiment of a communication system 900 for providing various communication services, such as delivering media content. The communication system 900 can represent an interactive media network, such as an interactive television system (e.g., an Internet Protocol Television (IPTV) media system). Communication system 900 can be overlaid or operably coupled with the systems of FIGS. 1-7 as another representative embodiment of communication system 900. For instance, one or more devices illustrated in the communication system 900 of FIG. 9 can include a processing system including a processor, and a memory that stores executable instructions that, when executed by the processing system, facilitate performance of operations. The operations can include obtaining a plurality of live streams at a broadband connection to the processing system; providing an interface to facilitate user input via a control device in communication with the processing system; presenting, responsive to a first user input, the plurality of live streams simultaneously at a display device; and identifying, responsive to a second user input, a set of favorite streams. The operations can also include presenting a program guide at the display device. The program guide can include a plurality of program guide objects; each of the set of favorite streams can include a separate program guide object that accordingly is selectable, via user input to the program guide, for presentation at the display device.

In one or more embodiments, the communication system 900 can include a super head-end office (SHO) 910 with at least one super headend office server (SHS) 911 which receives media content from satellite and/or terrestrial communication systems. In the present context, media content can represent, for example, audio content, moving image content such as 2D or 3D videos, video games, virtual reality content, still image content, and combinations thereof. The SHS server 911 can forward packets associated with the media content to one or more video head-end servers (VHS) 914 via a network of video head-end offices (VHO) 912 according to a multicast communication protocol. The VHS 914 can distribute multimedia broadcast content via an access network 918 to commercial and/or residential buildings 902 housing a gateway 904 (such as a residential or commercial gateway).

The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 906 and subsystems of the IPTV media system for services such as video-on-demand (VoD), browsing an electronic programming guide (EPG), or other infrastructure services.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as cable TV system 933 can be overlaid, operably coupled with, or replace the IPTV system and/or the satellite TV system as another representative embodiment of communication system 900. In this embodiment, the cable TV system 933 can also provide Internet, telephony, and interactive media services. System 900 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 930, a portion of which can operate as a web server for providing web portal services over the ISP network 932 to wireline media devices 908 or wireless communication devices 916.

Communication system 900 can also provide for all or a portion of the computing devices 930 to function as a server (herein referred to as server 930). The server 930 can use computing and communication technology to perform functions which can include among other things, providing stream content to hub 110. The media processors 906 and wireless communication devices 916 can be provisioned with software functions to utilize the services of server 930. For instance, functions of media processors 906 and wireless communication devices 916 can be similar to the functions described for media processor 101 and control device 102, in accordance with method 800.

Multiple forms of media services can be offered to media devices over landline technologies such as those described above. Additionally, media services can be offered to media devices by way of a wireless access base station 917 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 10:
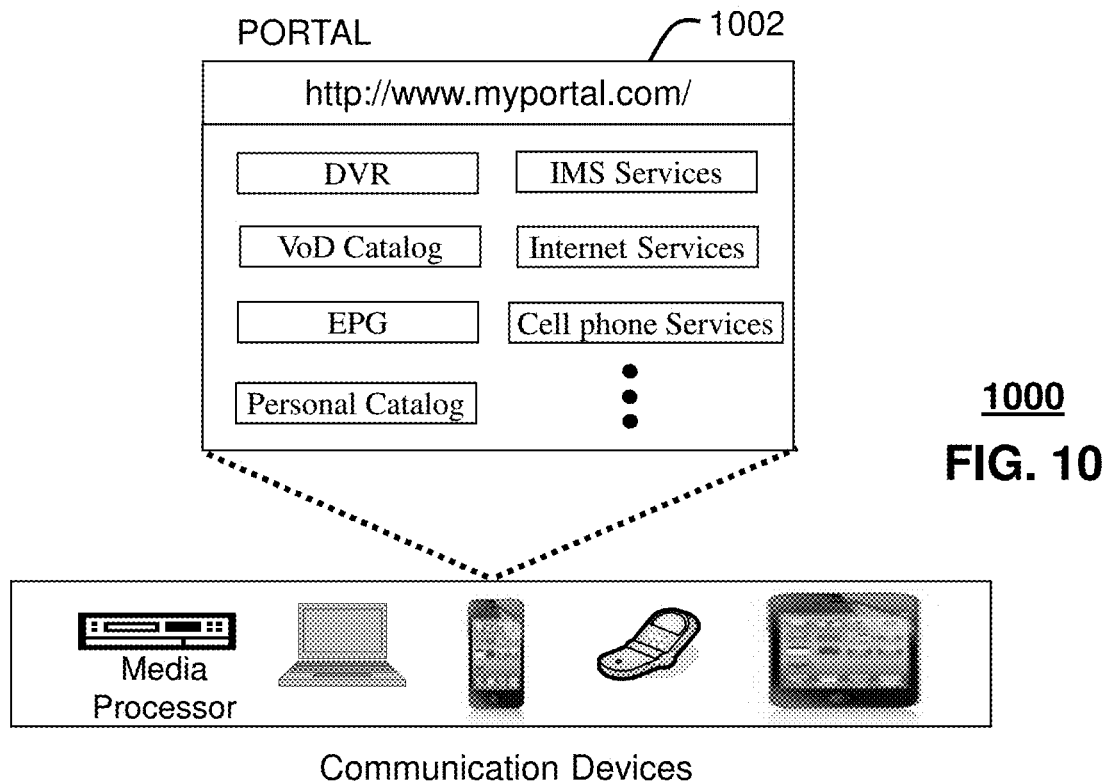
FIG. 10 depicts an illustrative embodiment of a web portal for interacting with the communication system of FIG. 8.

FIG. 10 depicts an illustrative embodiment of a web portal 1002 of a communication system 1000. Communication system 1000 can be overlaid or operably coupled with systems of FIGS. 1-7 and/or communication system 900 as another representative embodiment of systems FIGS. 1-7 and/or communication system 900. The web portal 1002 can be used for managing services of systems of FIGS. 1-7 and communication system 900. A web page of the web portal 1002 can be accessed by a Uniform Resource Locator (URL) with an Internet browser using an Internet-capable communication device such as those described in FIG. 9. The web portal 1002 can be configured, for example, to access a media processor 906 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 906. The web portal 1002 can also be used for provisioning IMS services described earlier, provisioning Internet services, provisioning cellular phone services, and so on.

The web portal 1002 can further be utilized to manage and provision software applications to adapt these applications as may be desired by subscribers and/or service providers of systems of FIGS. 1-7 and communication system 900. For instance, users of the services provided by server 930 can log into their on-line accounts and provision server 930 with user profiles, which the server can then access to provide featured streams of interest to the users. Service providers can log onto an administrator account to provision, monitor and/or maintain the systems FIGS. 1-7 and/or server 930.

Figure 11:
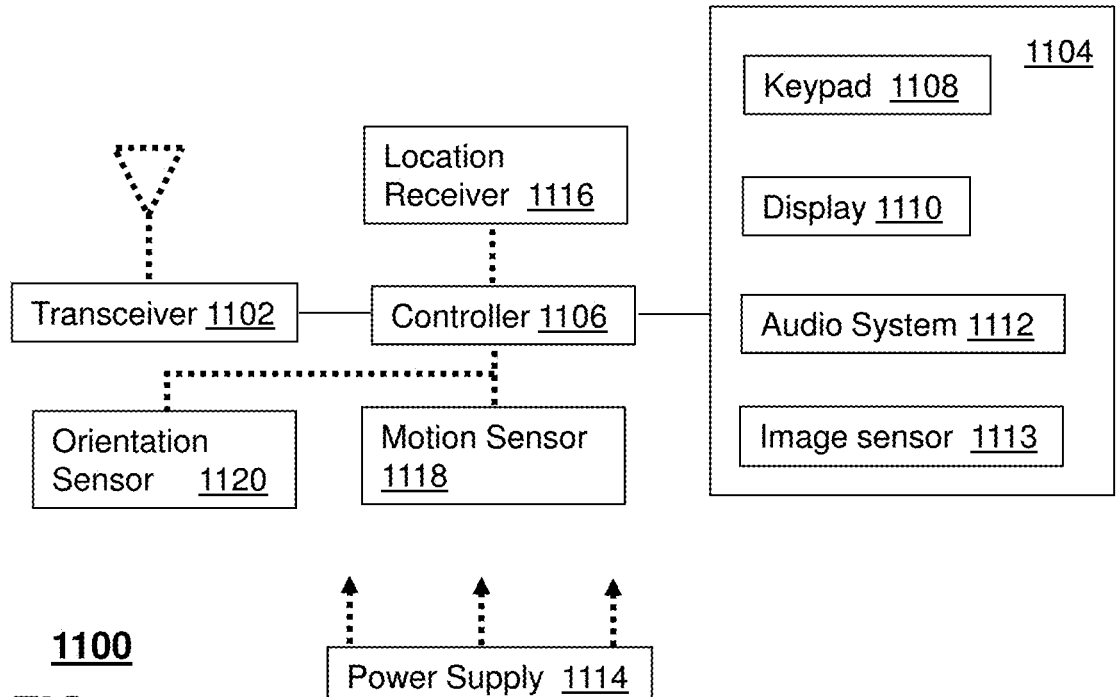
FIG. 11 depicts an illustrative embodiment of a communication device.

FIG. 11 depicts an illustrative embodiment of a communication device 1100. Communication device 1100 can serve in whole or in part as an illustrative embodiment of the devices depicted in FIGS. 1-7 and FIG. 9 and can be configured to perform portions of method 800 of FIG. 8.

Communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth®. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of devices of FIGS. 1-7, the media processor 906, the media devices 908, or the portable communication devices 916 of FIG. 9. It will be appreciated that the communication device 1100 can also represent other devices that can operate in the systems of FIGS. 1-7 or in communication system 900 of FIG. 9 such as a gaming console and a media player.

Upon reviewing the aforementioned embodiments, it would be evident to an artisan with ordinary skill in the art that said embodiments can be modified, reduced, or enhanced without departing from the scope of the claims described below. For example, the hub 110 can automatically update the program guide of FIG. 7 to include new streams not yet selected or viewed by the user. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 12:
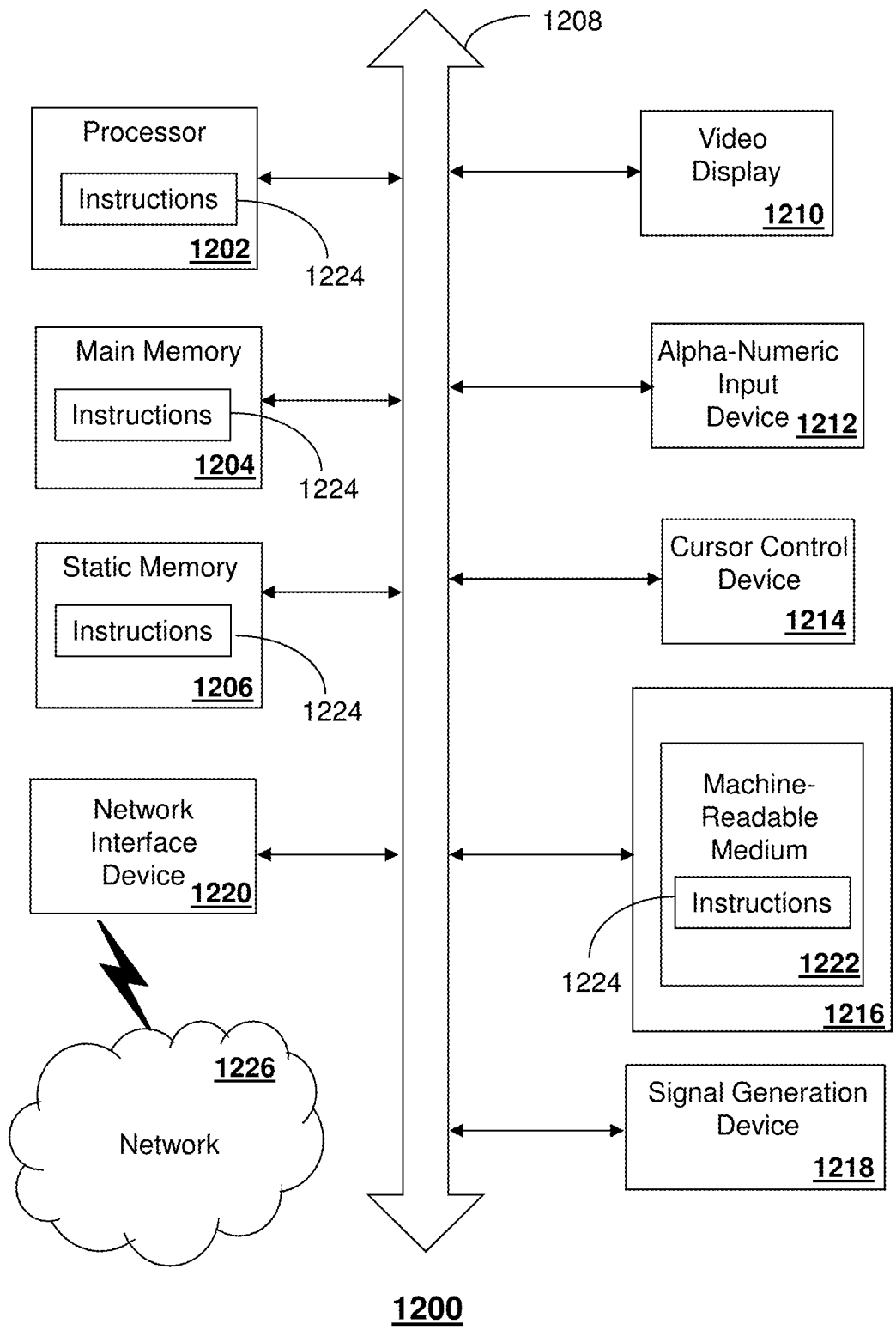
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the server 930, the media processor 906, the media processor 101, the remote control device 102, and other devices of FIGS. 1-7. In some embodiments, the machine may be connected (e.g., using a network 1226) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU)), a graphics processing unit (GPU, or both), a main memory 1204 and a static memory 1206, which communicate with each other via a bus 1208. The computer system 1200 may further include a display unit 1210 (e.g., a liquid crystal display (LCD), a flat panel, or a solid state display). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1200. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   obtaining, by a processing system including a processor, a plurality of live streams at a connection to the processing system;
   receiving, by the processing system, a voice activation command for a live streaming hub executing at the processing system;
   activating the live streaming hub, by the processing system, responsive to the voice activation command;
   presenting, by the live streaming hub, a program guide at a display device, wherein the program guide includes a plurality of program guide objects, wherein each stream of a set of live streams comprises a separate program guide object and accordingly is selectable for presentation at the display device, and wherein the set of live streams is a set of featured streams determined by the live streaming hub in accordance with predefined criteria, a set of user-selected favorite streams, or a combination thereof;
   presenting, by the live streaming hub, a search interface at the display device;
   receiving, via the search interface, input indicating a uniform resource locator (URL);
   identifying a live stream associated with the URL; and
   adding, by the live streaming hub, the live stream associated with the URL to the set of featured streams, wherein the program guide includes a first portion that displays information about a program presently being played, the information comprising a channel number, a program title and time slot, and a thumbnail of content of the program, wherein the program guide includes a second portion that displays the program guide objects associated with the set of featured streams as a listing, and wherein at least one guide object of the plurality of program guide objects associated with a live stream included in the set of live streams comprises a title of the live stream, a graphic associated with the live stream, and an icon for selecting the live stream.

2. The method of claim 1, wherein the processing system comprises a set top box in communication with a content provider system coupled to a network, and the plurality of live streams are obtained from network elements of the network.

3. The method of claim 2, wherein the processing system provides an interface to facilitate user input via a control device in communication with the processing system, wherein the control device comprises a remote control for the set top box.

4. The method of claim 2, wherein the plurality of live streams comprises video content streams currently available on the network.

5. The method of claim 1, wherein the program guide includes programs available via a plurality of channels, and wherein each stream of the set of live streams is included in the program guide as a separate channel.

6. The method of claim 1, wherein the program guide object corresponding to each stream of the set of live streams includes a selectable icon.

7. The method of claim 1, further comprising:
   receiving, by the processing system, a signal corresponding to a selection of one of the plurality of live streams; and
   displaying, by the live streaming hub and in accordance with the selection, a selected live stream in a full-screen mode of the display device.

8. A device, comprising:
   a processing system including a processor; and
   a memory that stores executable instructions that, when executed by the processing system, facilitate performance of operations comprising:
   obtaining a plurality of live streams at a connection to the processing system, via a plurality of network elements of a network;
   receiving a voice activation command for a live streaming hub executing at the processing system;
   activating the live streaming hub responsive to the voice activation command;
   presenting, by the live streaming hub, a program guide at a display device, wherein the program guide includes a plurality of program guide objects, wherein each stream of a set of live streams comprises a separate program guide object and accordingly is selectable for presentation at the display device, and wherein the set of live streams is a set of featured streams determined by the live streaming hub in accordance with predefined criteria, a set of user-selected favorite streams, or a combination thereof;
   presenting, by the live streaming hub, a search interface at the display device;

receiving, via the search interface, input indicating a uniform resource locator (URL);

identifying a live stream associated with the URL; and adding, by the live streaming hub, the live stream associated with the URL to the set of featured streams, wherein the program guide includes:

a first portion that displays information about a program presently being played; and a second portion that displays the program guide objects associated with the set of featured streams as a listing, and wherein at least one guide object of the plurality of program guide objects associated with a live stream included in the set of live streams comprises a title of the live stream, a graphic associated with the live stream, and an icon for selecting the live stream.

9. The device of claim 8, wherein the processing system comprises a set top box in communication with a content provider system coupled to the network.

10. The device of claim 9, wherein the processing system provides an interface to facilitate user input via a control device in communication with the processing system, wherein the control device comprises a remote control for the set top box.

11. The device of claim 8, wherein the plurality of live streams comprises video content streams currently available on the network.

12. The device of claim 8, the operations further comprising:

receiving a signal corresponding to a selection of one of the plurality of live streams; and displaying a selected live stream in a full-screen mode of the display device.

13. The device of claim 12, the operations further comprising:

displaying, responsive to the selection, a menu comprising selectable items including a recording option and a buffering option, wherein the selection comprises selection of an icon displayed at the display device and associated with the selected live stream, and wherein the selectable items include an option for saving a link, thereby adding the selected live stream to a set of favorite streams.

14. The device of claim 13, wherein selection of the buffering option enables a trickplay for the selected live stream.

15. A non-transitory machine-readable storage medium comprising executable instructions that, when executed by a processing system of a media processor, facilitate performance of operations comprising:

obtaining a plurality of live streams at a connection to the processing system, via a plurality of network elements of a network, wherein the plurality of live streams comprises video content streams currently available on the network;

receiving a voice activation command for a live streaming hub executing at the processing system;

activating the live streaming hub responsive to the voice activation command;

presenting, by the live streaming hub, a program guide at a display device, wherein the program guide includes a plurality of program guide objects, wherein each stream of a set of live streams comprises a separate program guide object and accordingly is selectable for presentation at the display device, and wherein the set of live streams is a set of featured streams determined by the live streaming hub in accordance with predefined criteria, a set of user-selected favorite streams, or a combination thereof;

presenting, by the live streaming hub, a search interface at the display device;

receiving, via the search interface, input indicating a uniform resource locator (URL);

identifying a live stream associated with the URL; and adding, by the live streaming hub, the live stream associated with the URL to the set of featured streams, wherein the program guide includes:

a first portion that displays information about a program presently being played; and a second portion that displays the program guide objects associated with the set of featured streams as a listing, and wherein at least one guide object of the plurality of program guide objects associated with a live stream included in the set of live streams comprises a title of the live stream, a graphic associated with the live stream, and an icon for selecting the live stream.

16. The non-transitory machine-readable storage medium of claim 15, the operations further comprising:

receiving a signal corresponding to a selection of one of the plurality of live streams; and displaying a selected live stream in a full-screen mode of the display device.

17. The non-transitory machine-readable storage medium of claim 16, the operations further comprising:

displaying, responsive to the selection, a menu comprising selectable items including a recording option and a buffering option, wherein the selection comprises selection of an icon displayed at the display device and associated with the selected live stream, and wherein the selectable items include an option for saving a link, thereby adding the selected live stream to a set of favorite streams.

18. The non-transitory machine-readable storage medium of claim 17, wherein selection of the buffering option enables a trickplay for the selected live stream.

19. The non-transitory machine-readable storage medium of claim 15, wherein the program guide includes programs available via a plurality of channels, and wherein each stream of the set of live streams is included in the program guide as a separate channel.

20. The non-transitory machine-readable storage medium of claim 15, wherein the program guide object corresponding to each stream of the set of live streams includes a selectable icon.

* * * * *